(12) United States Patent
Iida et al.

(10) Patent No.: US 6,879,322 B2
(45) Date of Patent: Apr. 12, 2005

(54) THREE-DIMENSIONAL OBJECT DISPLAY SYSTEM, THREE-DIMENSIONAL OBJECT DISPLAY METHOD AND RECORDING MEDIUM RECORDING A THREE-DIMENSIONAL OBJECT DISPLAY PROGRAM

(75) Inventors: Kazue Iida, Shizuoka (JP); Kenya Nakayama, Shizuoka (JP)

(73) Assignee: Fujitsu Limited, Kawasaki (JP)

(*) Notice: Subject to any disclaimer, the term of this patent is extended or adjusted under 35 U.S.C. 154(b) by 298 days.

(21) Appl. No.: 09/810,412

(22) Filed: Mar. 19, 2001

(65) Prior Publication Data
US 2001/0050687 A1 Dec. 13, 2001

(30) Foreign Application Priority Data

May 30, 2000 (JP) ........................................ 2000-160180

(51) Int. Cl.[7] .............................................. G06T 15/00
(52) U.S. Cl. ........................ 345/419; 345/619; 345/660; 345/664; 345/635
(58) Field of Search ................................. 345/419–420, 345/427, 619, 629, 635, 660, 663–664, 421, 422

(56) References Cited

U.S. PATENT DOCUMENTS 5,930,769 A * 7/1999 Rose ........................... 705/27
5,982,372 A * 11/1999 Brush et al. ................ 345/418
6,212,441 B1 * 4/2001 Hazama et al. ............... 700/98
6,240,421 B1 * 5/2001 Stolarz ....................... 707/102
6,262,694 B1 * 7/2001 Ishimoto et al. ............. 345/1.1
6,535,232 B1 * 3/2003 Tsuda et al. ................ 345/849

* cited by examiner

*Primary Examiner*—Matthew C. Bella
*Assistant Examiner*—Po-Wei Chen
(74) *Attorney, Agent, or Firm*—Staas & Halsey LLP

(57) ABSTRACT

A three-dimensional object display system for displaying a plurality of objects in an apparent three-dimensional space display according to a plurality of object attributes used as criteria for selecting one or more objects, the system including an object data storage unit that stores information corresponding to the plurality of object attributes and to display data for each object and a three-dimensional space data production unit that searches the object data storage unit, calculates coordinate values for three-dimensional space in which to position each object based on the plurality of object attribute values selected from among the object attributes for each object according to results of the search of the object data storage unit, and produces three-dimensional space data for displaying each object according to results of the calculation of the coordinate values for the three-dimensional space.

16 Claims, 13 Drawing Sheets

| PRODUCT NAME | ATTRIBUTE 1 | | ATTRIBUTE n | DETAILS INFORMATION | IMAGE FILE NAME |
|---|---|---|---|---|---|
| | | | | | |

THREE DIMENSIONAL SPACE

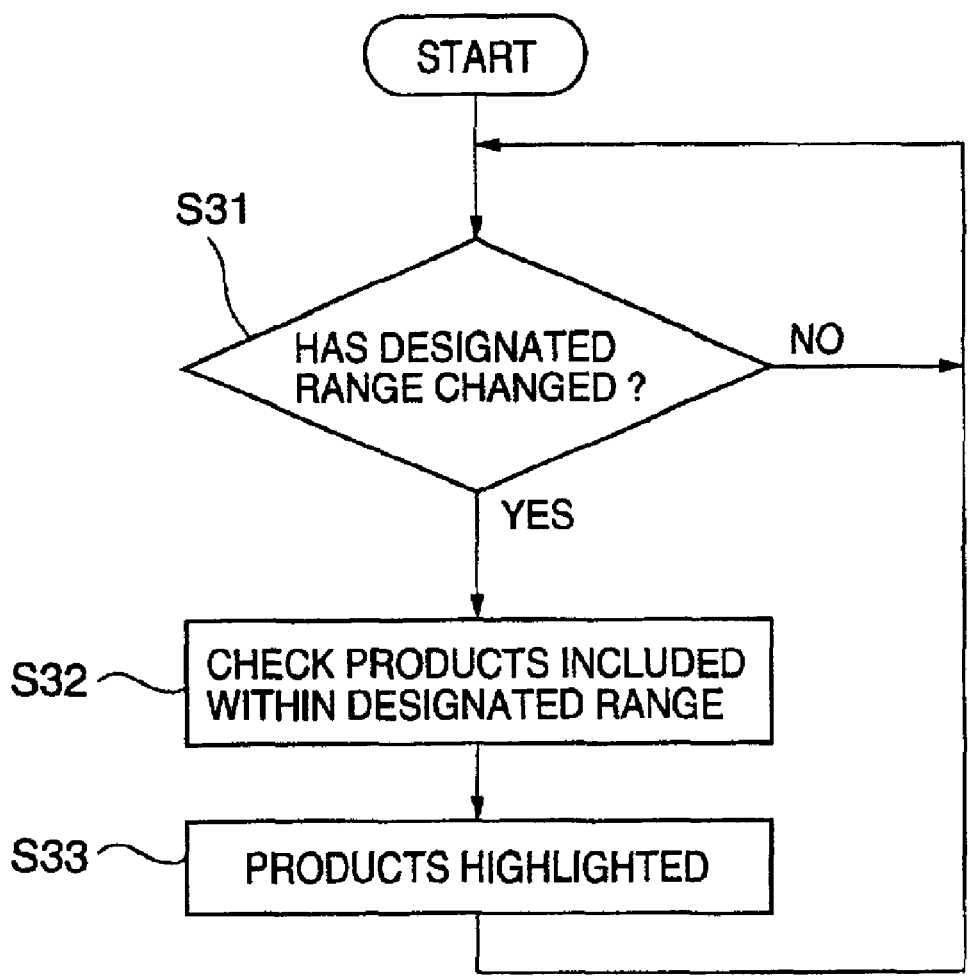

THREE-DIMENSIONAL OBJECT DISPLAY SYSTEM, THREE-DIMENSIONAL OBJECT DISPLAY METHOD AND RECORDING MEDIUM RECORDING A THREE-DIMENSIONAL OBJECT DISPLAY PROGRAM

BACKGROUND OF THE INVENTION

1. Field of the Invention

The present invention relates to a display system for displaying merchandise information provided to users in the course of internet shopping and the like, and more particularly, to a three-dimensional object display system, three-dimensional object display method and recording medium recording a three-dimensional object display program designed to display merchandise and other physical objects in three-dimensional space so as to facilitate user selection.

2. Description of Related Art

With the spread of network communications it has become common to buy and sell merchandise over the internet. The factors that lead purchasers to select merchandise from among a wide variety of types of articles is virtually unlimited, so a system that allows purchasers to make comparisons between articles with ease based on those selection factors is needed.

Additionally, recent advances in multimedia imaging have led to the introduction of methods for classifying data and displaying that data in three-dimensional space. However, when displaying three-dimensional objects on a two-dimensional display screen, difficulties arise with respect to manipulation and depth perception. To the user, a method for displaying spatial information in a way that is easy to use and easy to manipulate is needed.

Conventionally, transactions arising in the context of internet shopping and the like involves searching a product database according to desired purchase factors obtained from the purchaser, with a list of the resulting matches or "hits" displayed on a two-dimensional screen using alphanumeric or graphic image data. The purchaser then makes a comparison of the displayed product data and selects one or more desired items.

In the event that there are multiple purchase factors, then the search results differ depending on each such factor, so the purchaser must repeat the cycle of inputting desired purchase factors, viewing the hit product list and comparing the products so listed in order to arrive at the desired purchase.

At the same time, with advances in multimedia imaging a number of technologies for displaying a wide variety of objects in three-dimensional space have been suggested.

However, three-dimensional objects are difficult to visualize in two-dimensional space, and moreover it is difficult to manipulate such objects. For these reasons, a viable method for displaying three-dimensional information has yet to be realized. In particular, positioning a variety of products and merchandise in provisional three-dimensional space according to their attributes has not been carried out.

For example, in the case of internet shopping, the purchaser normally decides upon which items to purchase according to a variety of purchase criteria or factors (price, quality, volume and so forth). Ordinarily, items fitting the designated purchase criteria are displayed on a screen using alphanumeric or graphic data.

In the conventional art, the purchaser is required to input a number of purchase factors and view a list of displayed product "hits" before making a purchase, a process that needs to be repeated for each such purchase. Accordingly, when selecting an item to be purchased it is difficult for the purchaser to compare items on the basis of a plurality of factors for a single item displayed on a single screen.

BRIEF SUMMARY OF THE INVENTION

Accordingly, it is an object of the present invention to provide an improved and useful three-dimensional object display system, three-dimensional object display method and recording medium recording a three-dimensional object display program, in which the above-described disadvantages are eliminated.

The above-described object of the present invention is achieved by a three-dimensional object display system for displaying a plurality of objects in an apparent three-dimensional space display according to a plurality of object attributes used as criteria for selecting one or more objects, the system comprising:

an object data storage unit that stores information corresponding to the plurality of object attributes and to display data for each object; and a three-dimensional space data production unit that searches the object data storage unit, calculates coordinate values for three-dimensional space in which to position each object based on the plurality of object attribute values selected from among the object attributes for each object according to results of the search of the object data storage unit, and produces three-dimensional space data for displaying each object according to results of the calculation of the coordinate values for the three-dimensional space.

Additionally, the above-described object of the present invention is achieved by the three-dimensional object display system as described above, wherein the three-dimensional space data production unit encloses each of the objects positioned in the apparent three-dimensional space display within a frame of a uniform size and further reduces and enlarges the frame and the objects enclosed therein depending on a distance of the three-dimensional space from a vantage point outside the three-dimensional space.

According to these aspects of the invention, displaying the objects in apparent three-dimensional space facilitates comparison between objects (especially helpful in internet shopping) and the selection of items.

Additionally, the difficulties with depth perception attendant upon the conventional art are solved by displaying the objects within a frame of uniform size, such that the size of the displayed frame in three-dimensional space clarifies the relative depth positions of the objects.

Other objects, features and advantages of the present invention will become more apparent from the following detailed description when read in conjunction with the accompanying drawings.

BRIEF DESCRIPTION OF THE DRAWINGS

FIG. 11 is a flow chart showing steps in a process of setting space;

DETAILED DESCRIPTION OF THE INVENTION

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted.

Figure 1:
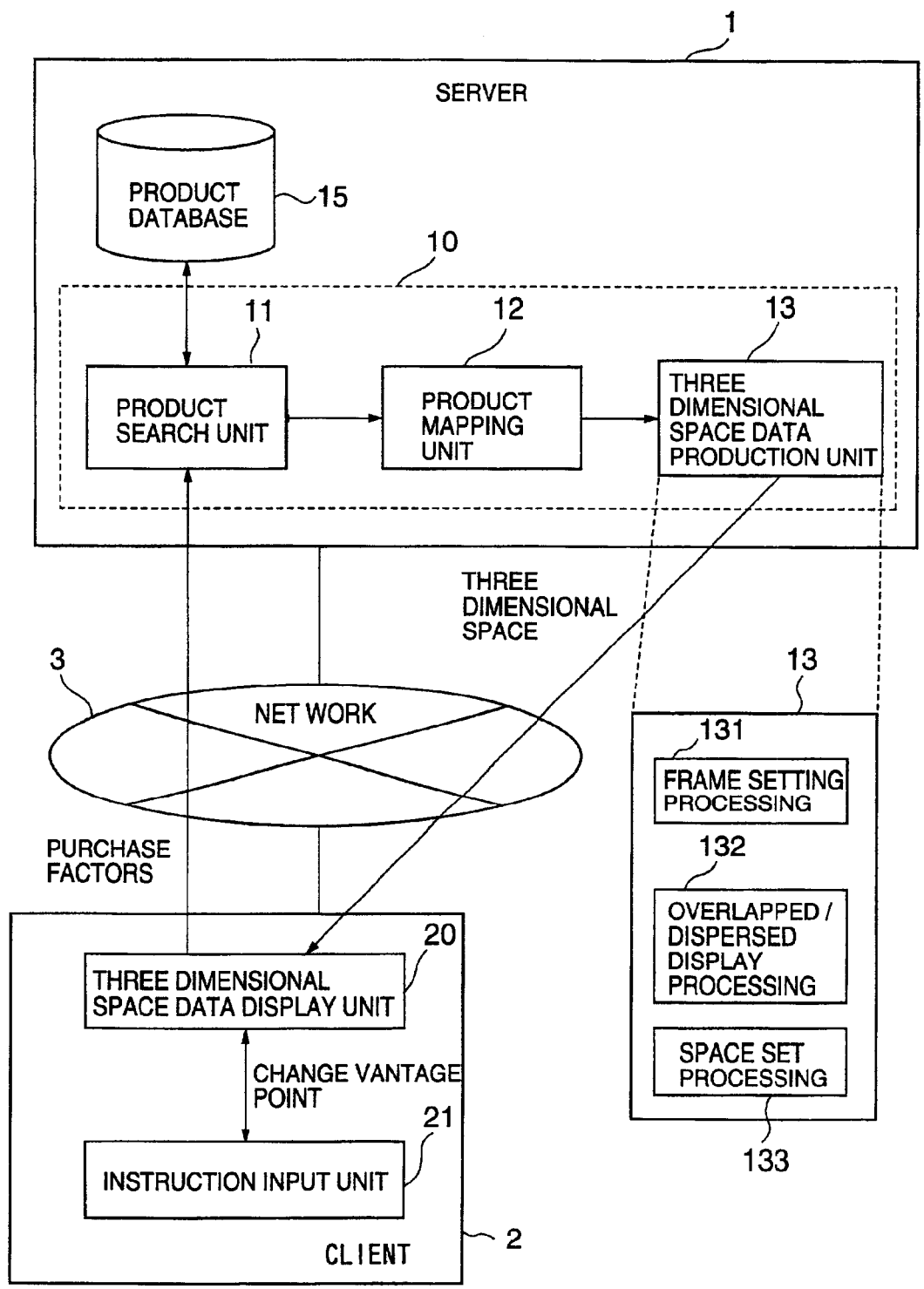
FIG. 1 is a block diagram of a product data display system according to one embodiment of the present invention.

FIG. 1 is a block diagram of a product data display system according to one embodiment of the present invention.

As shown in the diagram, the product data display system according to the present invention comprises a server computer 1 (hereinafter simply server) connected to a client computer terminal (hereinafter client) 2 via an electronic communications network such as the internet 3.

The server 1 comprises a product list production unit 10 that produces a product list based on product purchase factors input from the client 2, a product search unit 11 that searches for relevant products in a product database 15, a product mapping unit 12 that sets a three-dimensional space using input purchase factors as coordinate axes and calculates coordinate values for each product for the purpose of positioning product data extracted from the product database 15, and a three-dimensional space data production unit 13 that sets a size of the display and, where necessary, adds imbedded information (such as a description of the product, a link to a product detail site, and so forth).

The three-dimensional space data production unit 13 has the functions of executing a frame setting process 131, an overlapped/dispersed display process 132 and a space setting process 133.

In order to facilitate an understanding of the present invention, a detailed description will now be given of the frame setting process 131, the overlapped/dispersed display process 132 and the space setting process 133.

In the frame setting process 131, individual products within three-dimensional space are all displayed within a single frame size. The size of the frame is determined with reference to the overall size and balance of the three-dimensional space. The frame setting process 131 encloses the individual items within the three-dimensional space in a frame of a single uniform size, so that when a three-dimensional space data display unit 20 at the client 2 displays in two dimensions the three-dimensional space data transmitted from the server 1, those objects located at coordinates relatively distant from the vantage point are displayed at a size reduced in proportion to the relative distance from the vantage point, and conversely, those objects located at coordinates relative close to the vantage point are displayed at a size enlarged in proportion to their relative distance from the vantage point. As a result, a natural sense of depth is obtained, providing the purchaser with a correct sense of the relative positions of the objects within three-dimensional space.

The overlapped/dispersed display process 132 switches between an overlapping display and a dispersed or separated display of objects in those areas in which the locational coordinates of two or more product images contact each other. In the dispersed display mode, the display coordinates are corrected so that each frame within which the products are displayed is reduced so that the products obtain a size at which they do not overlap when displayed. The switching of the display involves, for example, dispersing items within a certain distance of the vantage point while overlapping items beyond that distance. Or, alternatively, three-dimensional space can be divided into blocks of a predetermined size, such that by moving the vantage point those items positioned within the blocks nearest the vantage point are all displayed in dispersed fashion while those items existing in the other blocks are displayed in overlapped fashion according to their original coordinate positions. By so doing, it is possible to prevent the inconvenience of overlapped display of contiguous items.

The space setting process 133 sets partial space capable of moving and being reduced/enlarged within three-dimensional space. Items included within such partial space are highlighted. Accordingly, the user can visually narrow the range of products required, easily distinguishing the desired product group from other product groups.

A three-dimensional space data display unit 20 of the client 2 is made possible by a worldwide web browser, and displays the three-dimensional space data received from the three-dimensional space data production unit 13. The client 2 is also equipped with an instruction input unit 21 connected to the three-dimensional space data display unit 20 for inputting product purchase factors, vantage point, detail display commands and the like.

A description will now be given of an operation of the system according to the present invention.

From the client 2 instruction input unit 21, the user (purchaser) inputs a plurality of product attributes (such as price, volume, quality, etc.) as purchase factors. The product attributes are then transmitted to the server 1.

At the server 1, the received attributes are transferred to the product search unit 11. The product search unit 11 searches product data in the product database 15 and notifies the product mapping unit 12 of specified product attribute values and image file names containing product data. The product mapping unit 12 matches the input product attributes against the spatial axes and sets the three-dimensional space, and calculates each product data position according to each of the product attribute values.

The three-dimensional space data production unit 13 produces three-dimensional space data using the coordinate values calculated by the product mapping unit 12 and the product data obtained from the product database 15, and outputs same to the client 2 via the network 3.

Using the three-dimensional space data display unit 20, the client 2 takes the received three-dimensional space data and displays it initially from a predetermined initial vantage point, allowing the purchaser to view a list of product data positioned in three-dimensional space based on the product attributes.

If there is input from the instruction input unit 21 to change the vantage point by for example advancing into or retreating from the three-dimensional space displayed, then the three-dimensional space data display unit 20 displays the three-dimensional space data from the new vantage point.

As described above, the present system allows the purchaser to input a number of purchase factors relating to the desired merchandise and uses the input factors to position product image data in three-dimensional space, thus facilitating comparisons between products as well as facilitating selection of the desired product or products. The product image data positioned in three-dimensional space may be a two-dimensional depiction such as a photograph or a three-dimensional image such as a video frame and the like.

A more detailed description will now be given of embodiments of the present invention, with reference to the accompanying drawings.

As noted above, FIG. 1 is a block diagram of a product data display system according to one embodiment of the present invention. The product list production unit 10 shown in FIG. 1 is a program that produces three-dimensional space data in which product image data is positioned in response to a request from the client 2 and returns that produced data to the client 2.

The three-dimensional space data display unit 20 is driven by a software program that analyzes three-dimensional space data received from the product list production unit 10. It should be noted that the three-dimensional space displayed here depends on the three-dimensional space data produced at the server 1.

Additionally, the client 2 can display detailed product information by selecting a product within the displayed three-dimensional space via the instruction input unit 21. Links to the product detail page so displayed as well as any additional information are imbedded within the three-dimensional space data created by the three-dimensional space data production unit 13 at the server 1. It should be noted that the link to the product detail page and so on represent locations at which detailed information on the product is stored, and are in the form of product detail page URL (Uniform Resource Locator).

Figure 2:
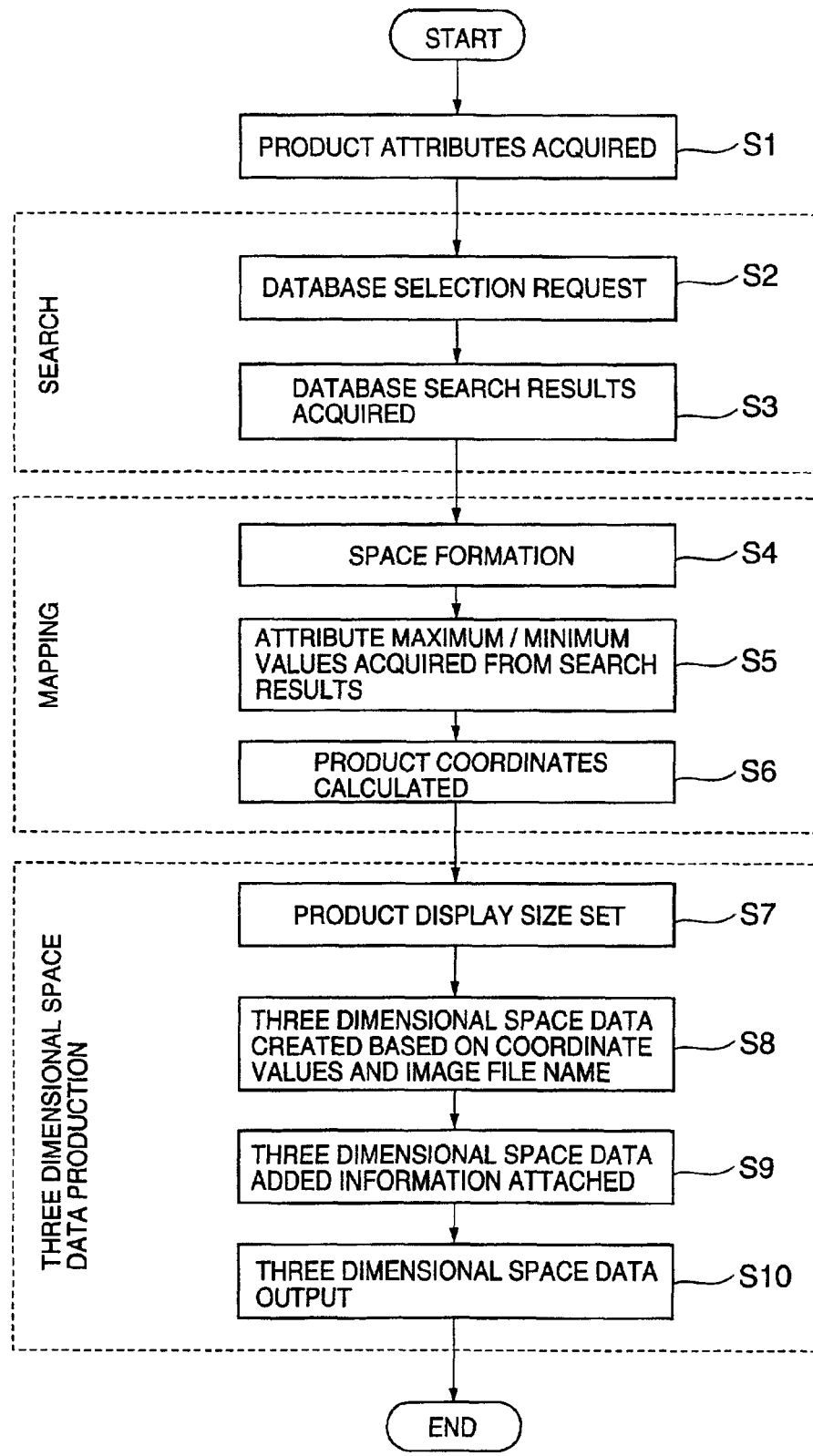
FIG. 2 is a flow chart showing steps in the production of a product list.

FIG. 2 is a flow chart showing steps in the production of a product list.

In a step S1, a product search unit 11 of the server 1 acquires the purchase factors (product attributes) the purchaser selected at a purchase factor selection screen using the client 2 instruction input unit 21.

Figures 3, 4:
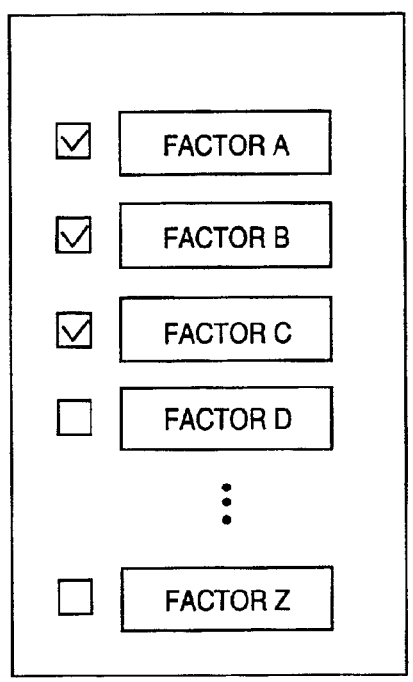
FIG. 3 is an example of a purchase factor selection screen.
FIG. 4 is an example of a product information table.

FIG. 3 is an example of a purchase factor selection screen.

As shown in the purchase factor selection screen of FIG. 3, the client 2 purchaser clicks on and specifies one or more of a plurality of purchase factors A–Z displayed on the screen. The purchase factors selected here are product attributes, so that if, for example, the product is liquor, the product attributes include price, volume, sharpness, etc.

In order to position the product data in three-dimensional space according to the product attributes, three types of product attributes are required. In the event that the selected product attributes number two or less, the system arbitrarily adds product attributes other than the selected product attributes in order to bring the number of product attributes up to three. Additionally, in the event that the selected product attributes number four or more, the system selects three such attributes according to a predetermined hierarchy.

In a step S2 the product selection unit 11 makes a search request of the product database 15 and in a step S3 acquires the results of that search.

FIG. 4 is an example of a product information table stored in a product database 15. The product information table, as shown in FIG. 4, carries information on each item, including product name, a plurality of product attributes that function as purchase factors, URLs indicating the sites of product detail pages, and graphic files in which product image data is stored.

Using the product mapping unit 12, in a step S4 the shape of the overall space displayed (for example, cubic, rectangular parallelepiped, etc.) is set and the selected three attributes are matched to the coordinate axes of three-dimensional space. In a step S5, attribute maximum/minimum values are obtained from the search results and the coordinates of the apexes of the space are determined. In a step S6 the three-dimensional space coordinates in which the product data will be positioned are calculated from the three types of attribute values of each item obtained in the search.

In a step S7, the three-dimensional space data production unit 13 determines the display size of the product with respect to the overall size and balance of the three-dimensional space, and in a step S8 produces three-dimensional space data based on the coordinate values and image file name.

Figure 5A:
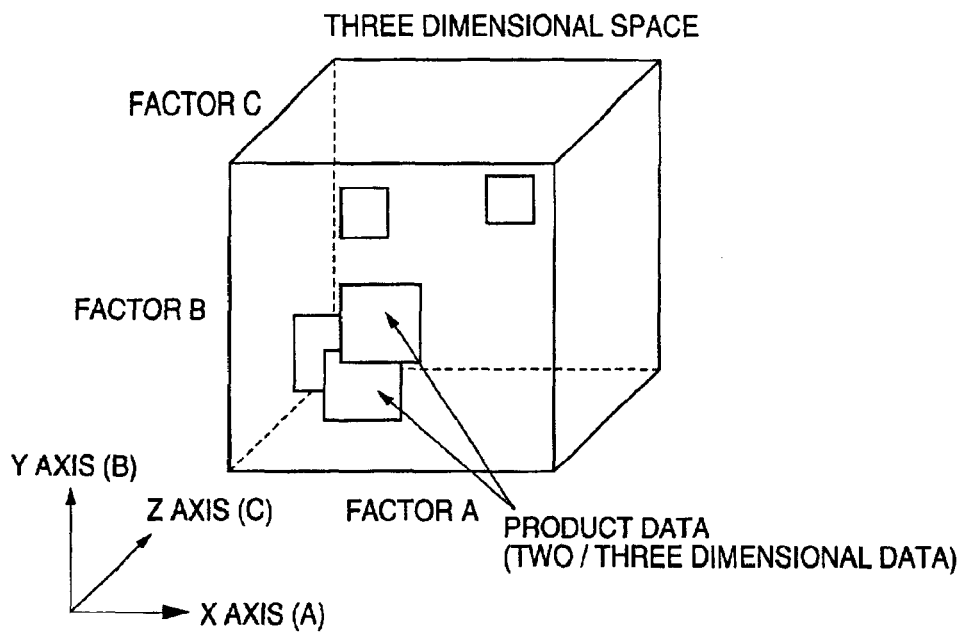
FIGS. 5A and 5B are diagrams illustrating a positioning of product data in three-dimensional space.
Figure 5B:
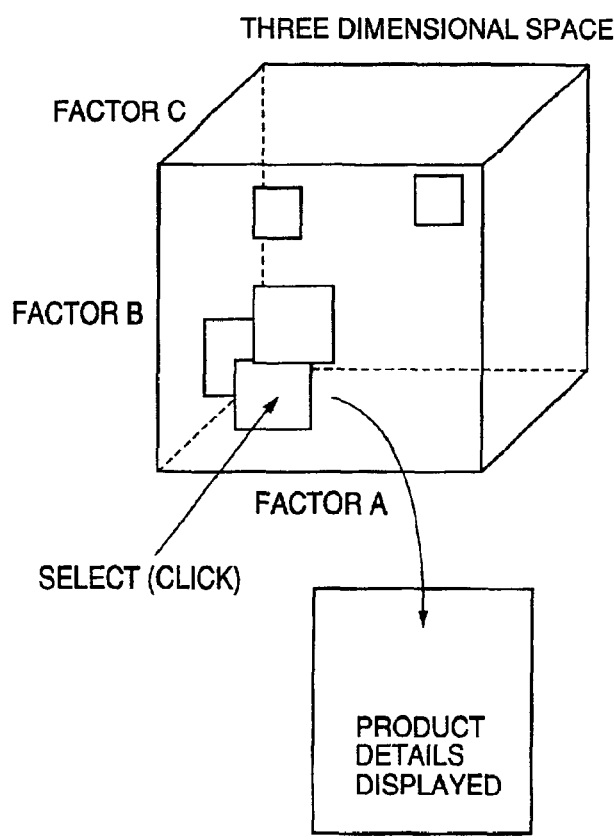

FIGS. 5A and 5B are diagrams illustrating a positioning of product data in three-dimensional space. In a case in which factors A through C have been selected from among a plurality of purchase factors shown in FIG. 3, then as shown in FIG. 5A factor A is matched to the X axis, factor B is matched to the Y axis and factor C is matched to the Z axis, with each apex of three-dimensional space being maximum/minimum values of the product attributes that are the individual factors. The product data is image data such as a photograph and the like, and is positioned in three-dimensional space according to the values of the individual product attributes.

Further, in a step S9 additional information is imbedded in the three-dimensional space data, information such as individual product attribute values, links to pages containing detailed information about the product, and so forth, and the resulting three-dimensional space data output as product list display data in a step S10.

As shown in FIG. 5B, by selecting (clicking on) the product data (image) in the three-dimensional space, a home page displaying detailed information about the product is displayed. It should be noted that it is possible to add audio data and alphanumeric data as the additional information described above that is imbedded in the three-dimensional space data, so that an audio or written description of the product follows when the cursor is placed atop the image or three-dimensional data.

Much product data is displayed within three-dimensional space. The present invention facilitates selecting products that fit the factors selected from among a large number of product groups by performing the following types of three-dimensional space data production processes using the three-dimensional space data production unit 13.

Figure 6:
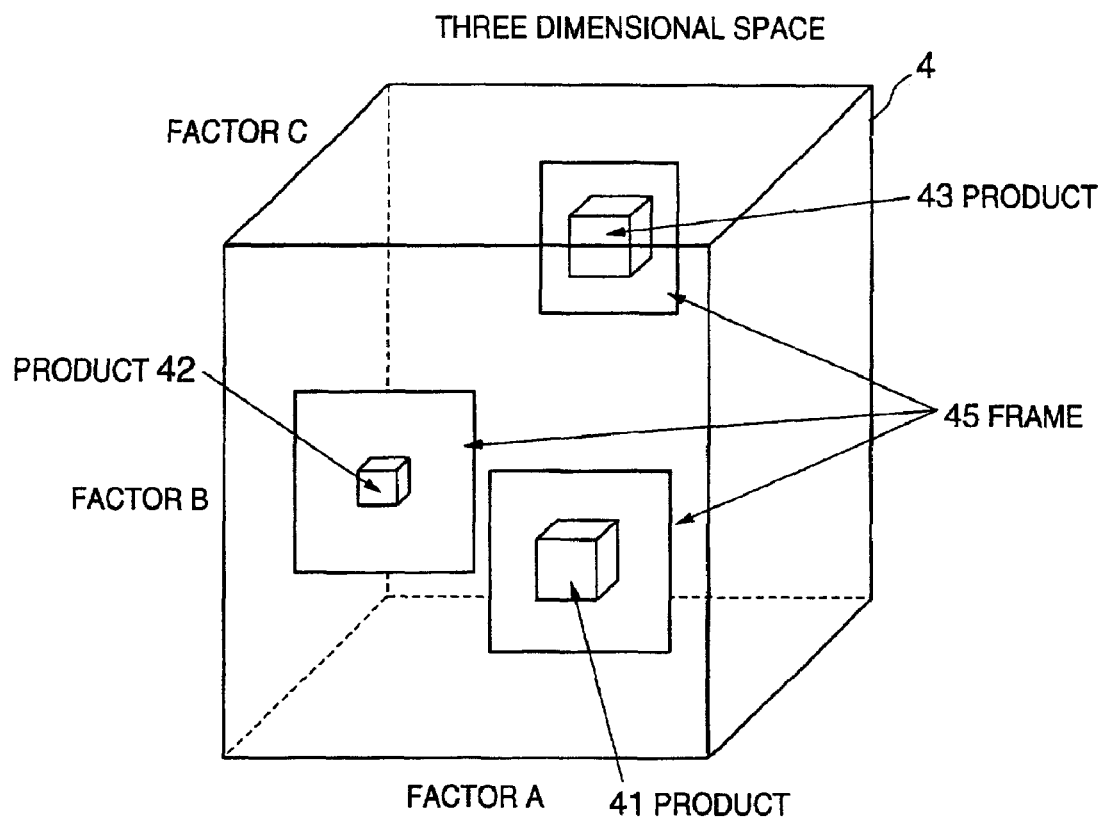
FIG. 6 is a diagram illustrating a process of setting a frame.

FIG. 6 is a diagram illustrating a process 131 of setting a frame using the three-dimensional space data production unit 13. As shown in the diagram, image data of products 41–43 are positioned within three-dimensional space 4 that uses factors A, B and C as coordinate axes.

Products 41 and 42 are positioned at the same location in a depth direction and in front of product 43. Reference numeral 45 is a frame that encloses the products 41–43. If the products were to be displayed within the three-dimensional space 4 without the frame, then depending on the size of the product itself a smaller product would appear to be placed distant from an observer and a larger product would be appear to be placed closer to an observer. Here, however, all three products 41–43 are placed within the same size frame 45. That is, if there were no frame 45, then the product 42 would be smaller than the product 41 and the product 42 would appear to be further away than the product 41. However, with the use of the frame 45, it can be ascertained that the products 41 and 42 are located at the same depth relative to an observer. By the same token, products 41 and 43 appear to be the same size, but their placement within the frame 45 allows the observer to recognize that product 43 is located further back than product 41.

Figure 7:
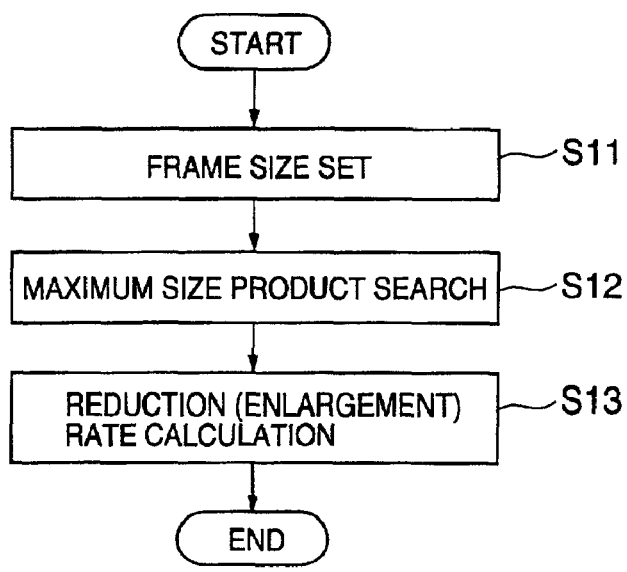
FIG. 7 is a flow chart showing steps in a process of setting a frame.

FIG. 7 is a flow chart showing steps in a process of setting a frame.

In a step S11, the three-dimensional space data production unit 13 sets the size of the frame so as to accommodate the three-dimensional space to be displayed. The size of the frame can be freely set by either the product information provider or by the system operator. It is desirable that the size of the frame is determined with reference to the number of articles to be displayed, ease of viewing when displayed and overall balance. Next, in a step S12 the product having the largest size within the space is searched. In a step S13 the degree to which that product image is to be enlarged or reduced so as to fit appropriately within the space is calculated and the reduction/enlargement rate so obtained used to recalculate the sizes of all the products to be displayed within the space.

Figure 8A:
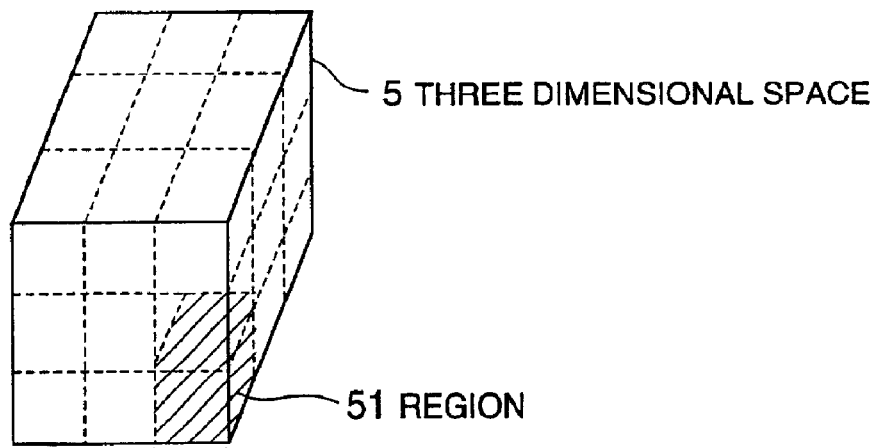
FIGS. 8A, 8B and 8C are diagrams showing steps in a process of overlapped/dispersed display.
Figure 8B:
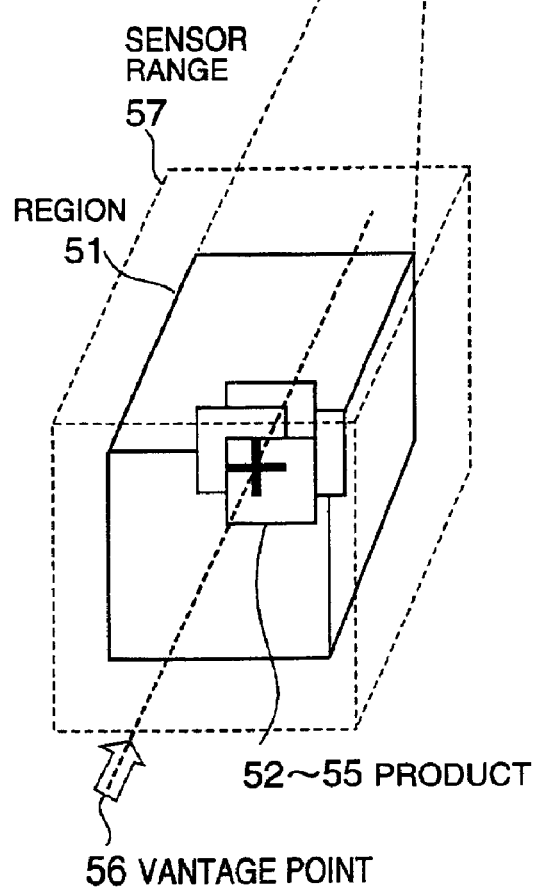
Figure 8C:
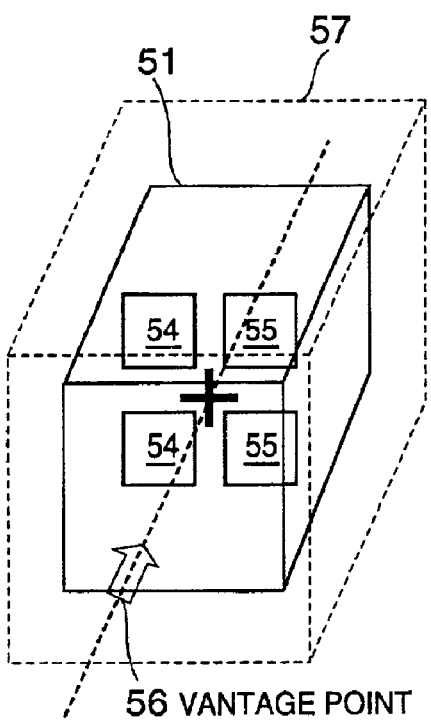

FIGS. 8A, 8B and 8C are diagrams showing steps in a process of overlapped/dispersed display.

As shown in FIG. 8A the three-dimensional space 5 in which the products are placed is divided into rectangular blocks of a certain size in order to determine a region in which the coordinates are contiguous.

Shown in FIGS. 8B and 8C is one such rectangular block 51, enlarged for ease of explanation. Products 52, 53, 54 and 55 are included within the rectangular region 51, the coordinates of these products being contiguous. FIGS. 8B and 8C show two different states of display of the products 52-55 within the rectangular block 51 created by a change in the vantage point 56. In order to detect the vantage point 56, a region, that is, a sensor range 57 having a size that encloses the rectangular block 51 is provided. As the vantage point 56 enters the sensor range 57 the vantage point 56 is deemed to have approached the rectangular block 51, and the display state of the products 52–55 changes.

FIG. 8B shows a state in which the vantage point 56 is outside the sensor range 57 and thus relatively far from the products 52–55. In such a state, the products 52–55 are displayed in an overlapped state, retaining their large size. By contrast, FIG. 8C shows a state in which the vantage point 56 is within the sensor range 57 and thus relatively close to the products 52–55. In such a state, the products are reduced in size and their coordinates dispersed so as not to be displayed in an overlapped state.

By changing the state of the display depending upon the relation between the vantage point on the one hand and the position of the products within the three-dimensional space on the other, even products positioned contiguously can be displayed in a state that is easy to view simply by moving the vantage point as appropriate.

Figure 9:
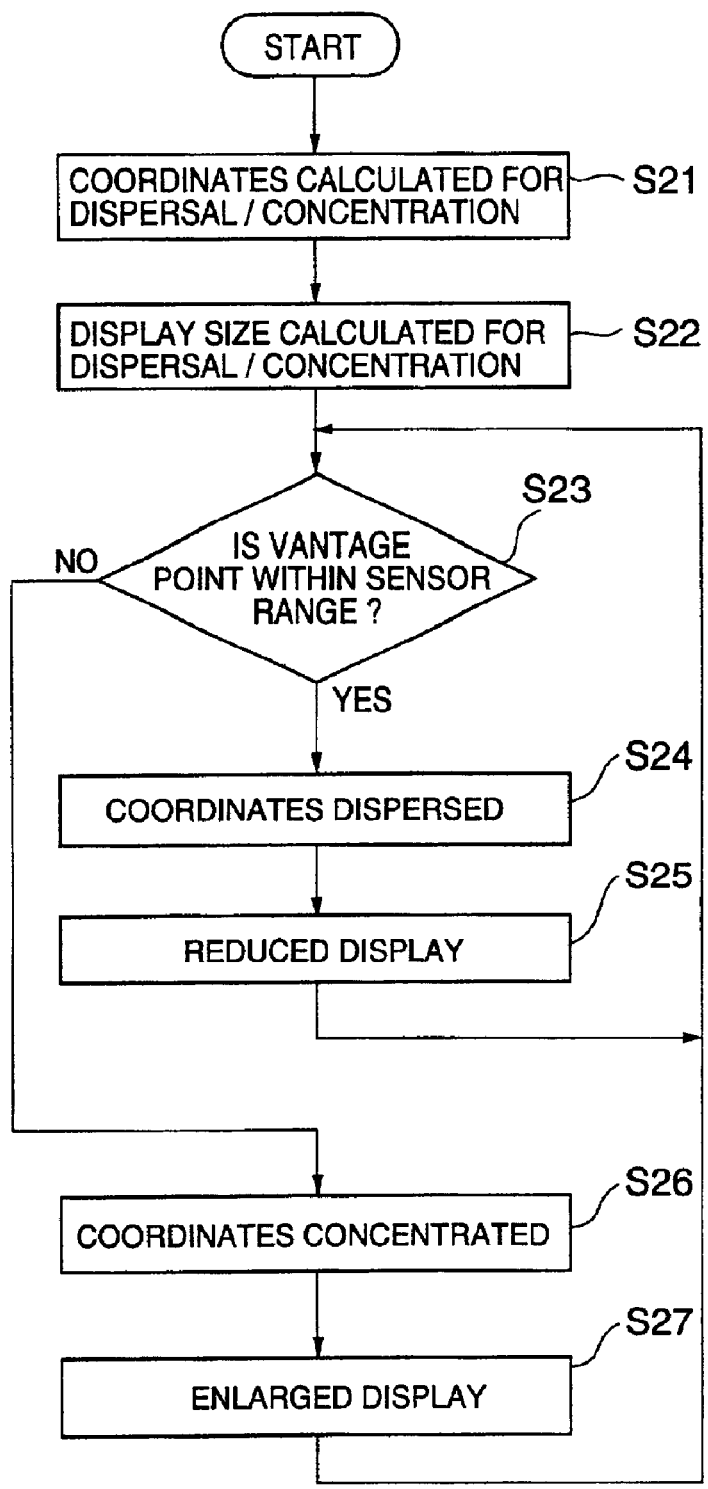
FIG. 9 is a flow chart illustrating steps in a process of overlapped/dispersed display.

FIG. 9 is a flow chart illustrating steps in a process of overlapped/dispersed display.

In a step S21, the dispersal/concentration coordinates of the positioned products are calculated and in a step S22 the display size at dispersal/concentration is calculated. The vantage point 56 is checked and in a step S23 it is determined per each rectangular block 51 whether the vantage point 56 enters the sensor range 57. If the vantage point 56 is within the sensor range 57, then in a step S24 the coordinates are dispersed and the display size reduced in a step S25 as per the reduction obtained in step S22 so as to be able to display all the products within the rectangular block 51.

If on the other hand the vantage point 56 is not within the sensor range 57, then in a step S26 the product coordinates are concentrated and in a step S27 the products are displayed at their normal size in an overlapped state.

Figure 10A:
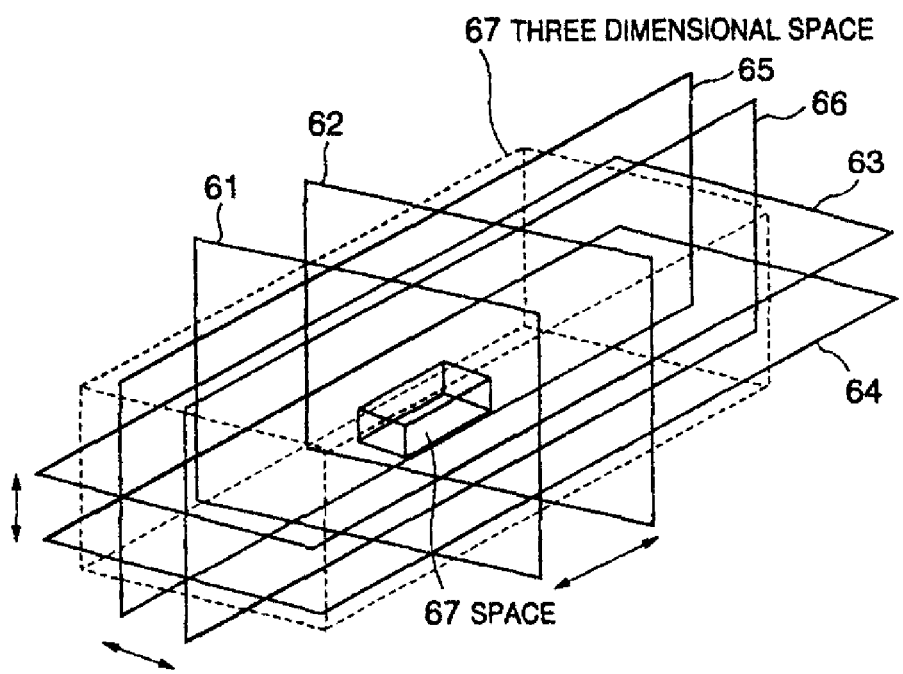
FIGS. 10A and 10B are diagrams illustrating a process of setting space.
Figure 10B:
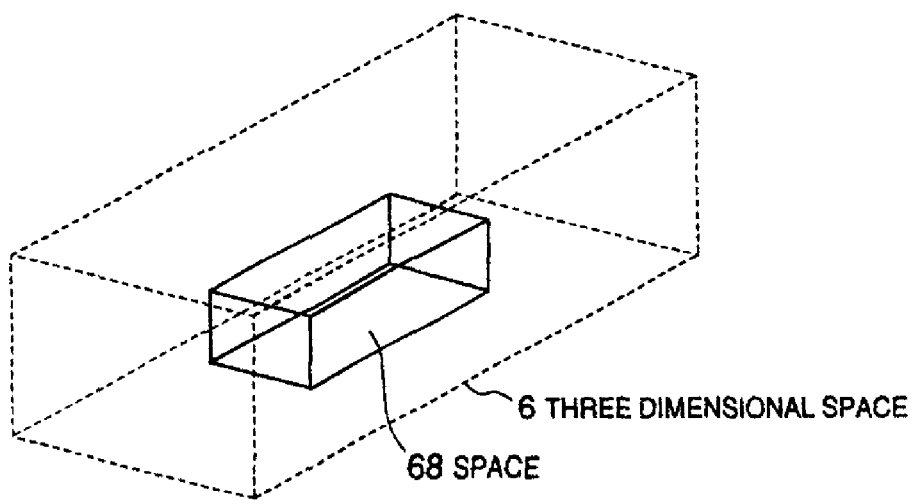

FIGS. 10A and 10B are diagrams illustrating a process of setting space, in which a portion of three-dimensional space is selected. In order to display the product group that the purchaser is trying to view more clearly, the products included in a selected portion of the three-dimensional space are highlighted. There are two methods of selecting a portion of space as shown in FIGS. 10A and 10B. Either one may be used.

In FIG. 10A, reference numeral 6 denotes three-dimensional space, 61 and 62 denote a plane perpendicular to the Z axis (in a depth direction), 63 and 64 denote a plane perpendicular to the Y axis (in a vertical direction), and 65 and 66 denote a plane perpendicular to the X axis (in a horizontal direction), the planes being used to divide the three-dimensional space 6. The planes 61, 62 and 63, 64 and 65, 66 can be moved in the direction of the Z, Y and X axes, respectively. Reference numeral 67 is a space divided by the planes 61–66. By being able to freely move the planes that divide the space 67, the purchaser can specify visually a portion of the space within the three-dimensional space 6.

In FIG. 10B, the reference numeral 6 designates three-dimensional space. Reference numeral 68 designates space within the three-dimensional space 6 that can be moved. In the method of FIG. 10B, the shape of the space 68 is shown as substantially rectangular. However, other shapes are also possible, including spheres and the like. Additionally, the space 68 can also be enlarged/reduced as needed. By designating a portion of space 68 within the three-dimensional space 6, the purchaser can specify visually a portion of space.

When these types of space 67 and 68 are designated, the three-dimensional space data production unit 13 highlights the product data contained therein in order to enable the purchaser to distinguish such product data from other product data. Methods of highlighting can include brightening the designated area or displaying it in a different color or within a flashing framework. It is also possible to hide all the other product data, leaving only the product data within the designated area displayed.

FIG. 11 is a flow chart showing steps in a process of setting space. In a step S31, input from the client 2 is monitored for any change in designated range. If there is a change, then in a step S32 the products within the designated range are checked and in a step 33 are highlighted. By so doing, the purchaser can visually focus on the desired products, and the desired products can be highlighted so as to distinguish them from other products displayed, facilitating selection.

Figure 12:
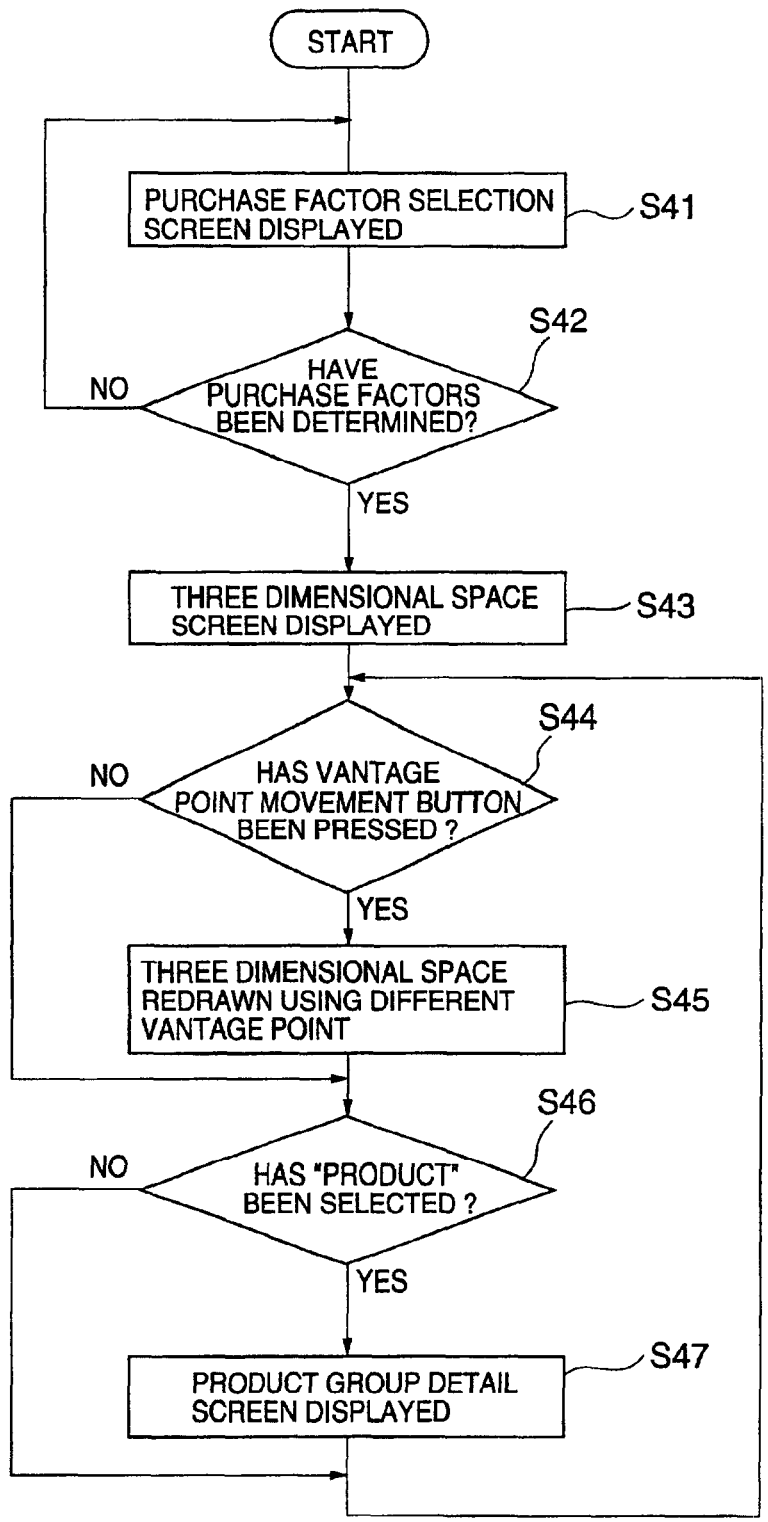
FIG. 12 is a flow chart showing a sequence of screens displayed at a purchaser's terminal.
Figure 13:
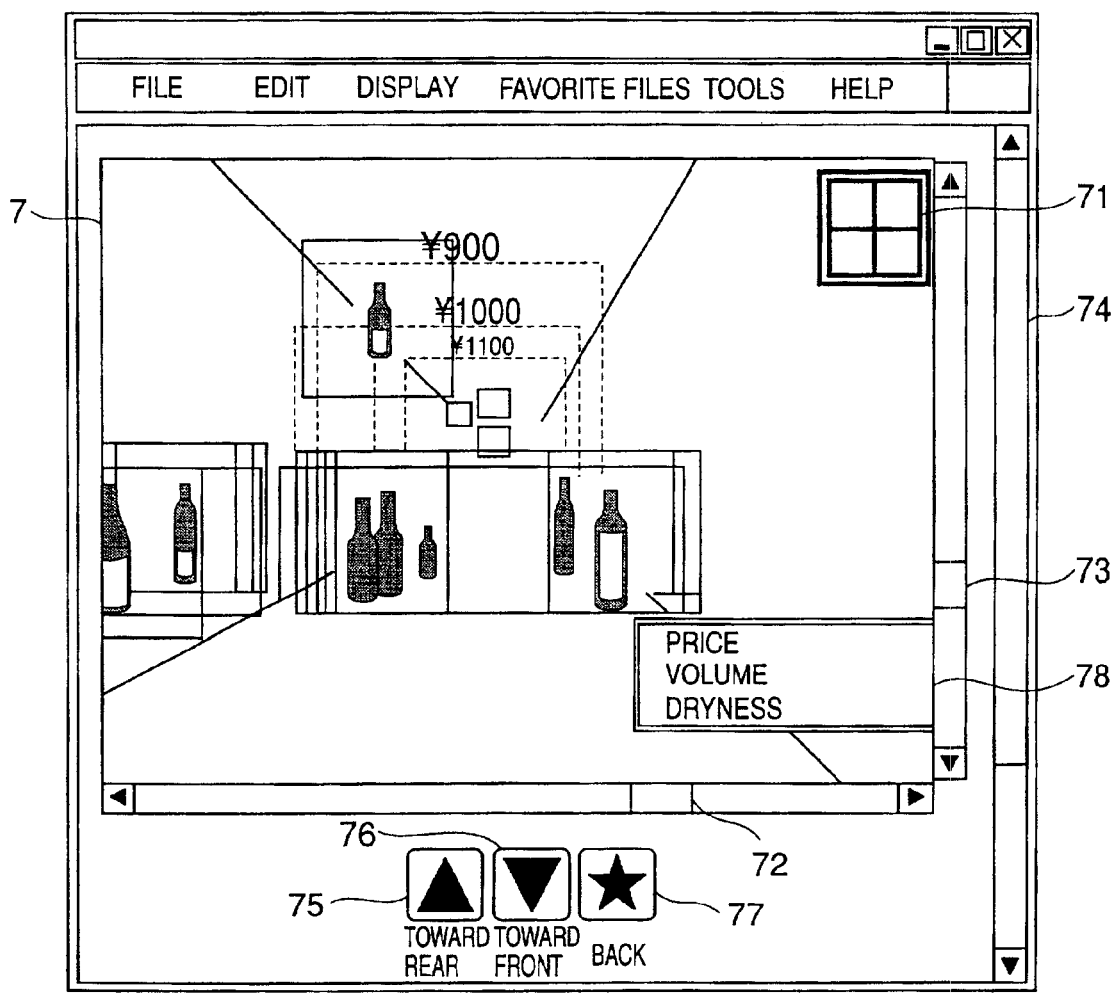
FIG. 13 is a diagram showing an example of a three-dimensional data display screen.
Figure 14:
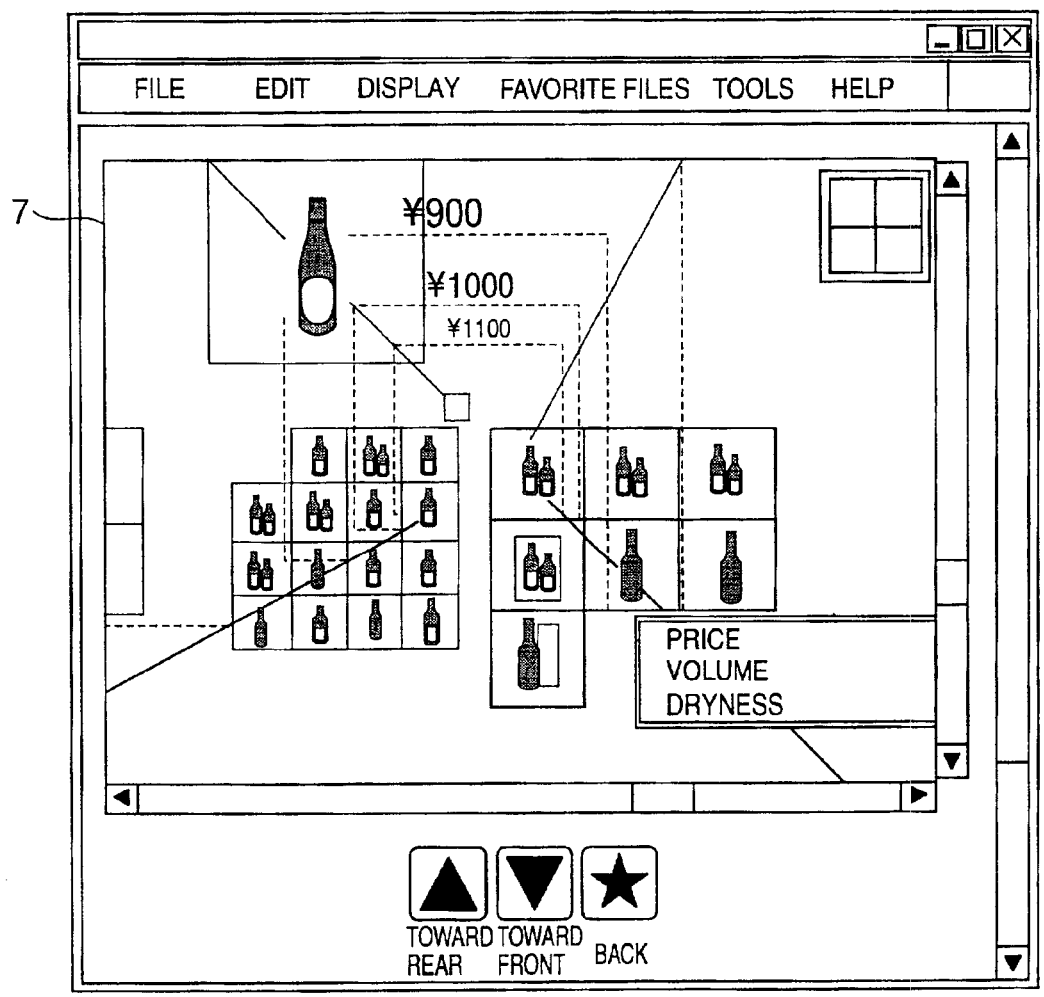
FIG. 14 is a diagram showing an example of a redrawn three-dimensional data display screen.
Figure 15:
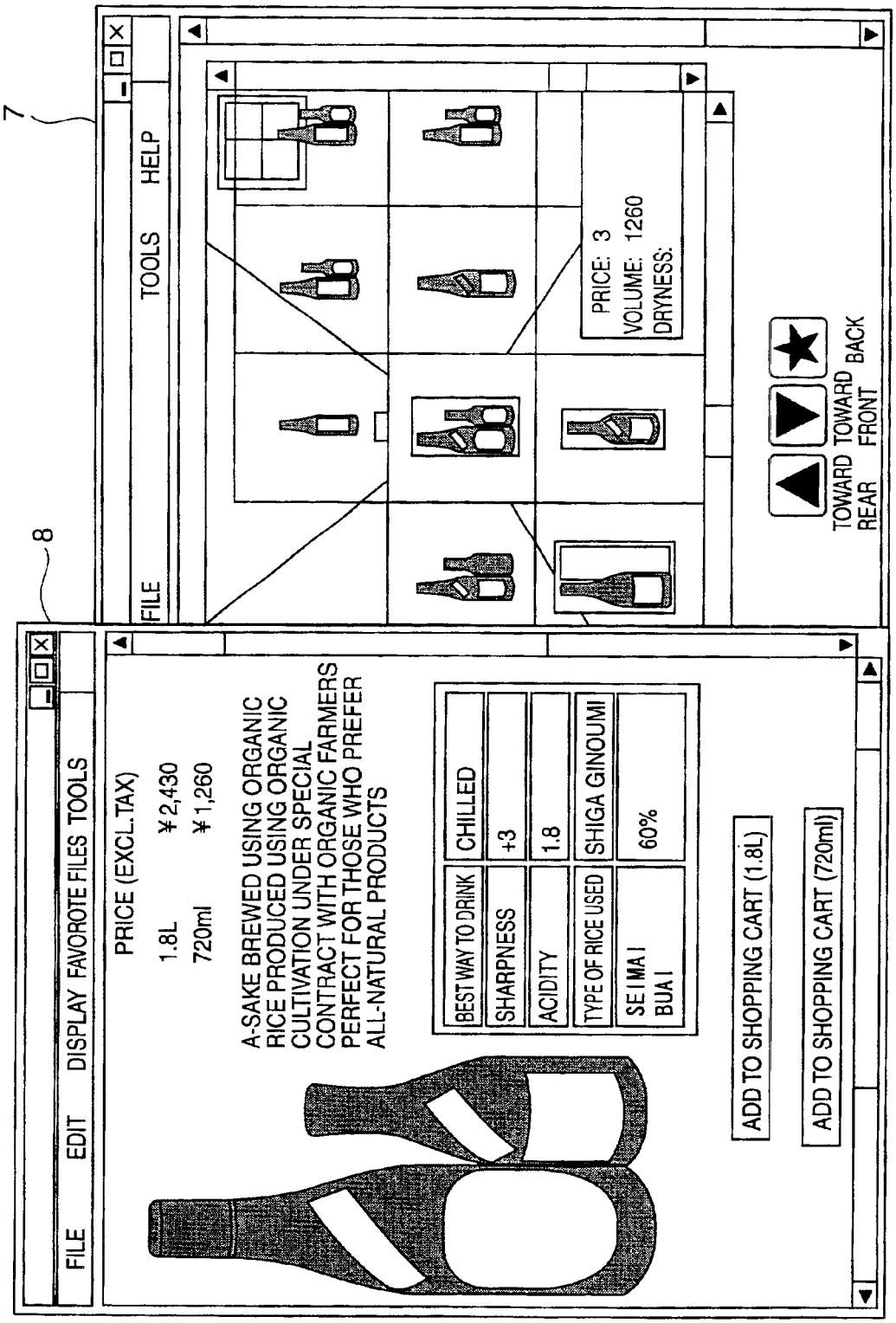
FIG. 15 is a diagram showing an example of a three-dimensional data display screen and product detail display.

FIG. 12 is a flow chart showing a sequence of screens displayed at a purchaser's terminal. FIG. 13 is a diagram showing an example of a three-dimensional data display screen. FIG. 14 is a diagram showing an example of a redrawn three-dimensional data display screen. FIG. 15 is a diagram showing an example of a three-dimensional data display screen and product detail display.

In a step S41, a purchase factor selection screen like that shown in FIG. 3 is first shown on the client's terminal 2 with an initial exchange with the server 1. It is at the purchase factor selection screen that, for example in the case of purchasing liquor, the purchaser inputs a variety of purchase factors such as a desired price, volume, degree of sharpness and so forth (product attributes), with the following description assuming such a case.

When the purchase factors have been determined in a step S42, the purchase factors are transmitted to the server 1 and in a step S43 a three-dimensional space screen 7 like that shown in FIG. 13 is displayed based in the three-dimensional space data transmitted from the server 1.

As noted above, FIG. 13 is a diagram showing an example of a three-dimensional space screen 7. In this case, the X axis (in a horizontal direction) corresponds to degree of sharpness, the Y axis (in a vertical direction) corresponds to volume and the Z axis (in a depth direction) corresponds to price.

It should be noted that in the display of the three-dimensional space screen 7 the vantage point is not within the sensor range, so the products are displayed in an overlapped state. Reference numeral 71 displays the vantage point along the X and Y axes. In this example, the vantage point is shown positioned at a lower right side of the three-dimensional space. Movement of the vantage point can be accomplished using the scroll bars 72 and 73. The scroll bar 74 scrolls the entire screen. The vantage point can be moved along the Z axis by using buttons 75 and 76, so that the vantage point moves toward the front when the button 75 is depressed and the vantage point moves to the rear when the button 76 is depressed. Pressing a button 77 returns the vantage point to an original position.

If in a step S44 either the vantage point movement buttons 75, 76 or the scroll bars 72, 73 are operated when the three-dimensional space screen 7 is being displayed, then in a step S45 the three-dimensional space data display unit 20 redraws the three-dimensional space screen 7 according to the changed vantage point.

As noted above, FIG. 14 is a diagram showing an example of a redrawn three-dimensional data display screen. In the display of this three-dimensional space screen 7, the vantage point movement button 75 has been pressed and the vantage point has been moved forward, placing the region of the product group positioned furthest to the front within the sensor range, so the products have been dispersed so as not to be displayed overlapped.

If in a step S46 "product" is then selected from the displayed three-dimensional space screen 7, then in a step S47 a product detail screen is displayed. Thus FIG. 15 for example shows a case in which the product in the center of the three-dimensional space screen 7 is selected and the product detail screen 8 is displayed. The product detail screen 8 is called up and displayed by a defined URL added to the display of each product.

As shown in the example depicted in FIG. 13, each product is displayed within a frame of a uniform size. The display size on the screen of the frame functions as a reference for the comparison of relative positions of products in the depth direction. Accordingly, mistakes in perception of relative positions due to the size of the products themselves are eliminated.

Additionally, as shown in the example depicted in FIG. 14, products with regions with contiguous coordinates are displayed not according to their actual coordinates but in the interest of viewing ease according to a revised size and set of coordinates. Accordingly, the items are prevented from overlapping each other.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2000-160180, filed on May 30, 2000, the contents of which are hereby incorporated by reference.

What is claimed is:

1. A three-dimensional object display system to display objects in an apparent three-dimensional space display according to object attributes used as criteria to select one or more objects, the system comprising:

an object data storage unit storing information corresponding to the object attributes and displaying data for each object; and a three-dimensional space data production unit searching the object data storage unit, calculating coordinate values of a three-dimensional space in which to position each object based on the object attribute values selected from the object attributes of each object according to results of the search of the object data storage unit, and producing three-dimensional space data displaying each object according to results of the calculation of the coordinate values for the three-dimensional space, wherein the three-dimensional space data production unit encloses each of the objects positioned in the apparent three-dimensional space display within a frame of a uniform size and reduces or enlarges the frame and the objects enclosed therein depending on a distance of the three-dimensional space from a vantage point outside the three-dimensional space, and wherein the uniform size of the frame is determined based on a number of articles to be displayed, ease of viewing when displayed, and overall balance.

2. A three-dimensional object display system to display objects in an apparent three-dimensional space display according to object attributes used as criteria to select one or more objects, the system comprising:

an object data storage unit storing information corresponding to the object attributes and displaying data for each object; and a three-dimensional space data production unit searching the object data storage unit, calculating coordinate values of a three-dimensional space in which to position each object based on the object attribute values selected from the object attributes of each object according to results of the search of the objected data storage unit, and producing three-dimensional space data displaying each object according to results of the calculation of the coordinate values for the three-dimensional space, wherein the three-dimensional space data production unit disperses positional coordinates of each object and reduces the display size of each object positioned within the apparent three-dimensional space display preventing object data to be displayed in an overlapped state when the objects have identical or contiguous coordinates and when a distance of the three-dimensional space from a vantage point is within a range, wherein each object positioned in the apparent three-dimensional space display is enclosed within a frame of uniform size, the uniform size based on a number of articles to be displayed, ease of viewing when displayed and overall balance.

3. A three-dimensional object display system to display objects in an apparent three-dimensional space display according to object attributes used as criteria to select one or more objects, the system comprising:

an object data storage unit storing information corresponding to the object attributes and displaying data for each object; and a three-dimensional space data production unit searching the object data storage unit, calculating coordinate values of a three-dimensional space in which to position each object based on the object attribute values selected from the object attributes of each object according to results of the search of the object data storage unit, and producing three-dimensional space data displaying each object according to results of the calculation of the coordinate values for the three-dimensional space, wherein the three-dimensional space data production unit comprises:

a dividing unit dividing the three-dimensional space into movable planes or solid spaces; and a display unit selecting and highlighting object data positioned within the divided planes or solid spaces, and wherein each object positioned in the apparent three-dimensional space display is enclosed within a frame of uniform size, the uniform size based on a number of articles to be displayed, ease of viewing when displayed and overall balance.

4. A three-dimensional object display system to display objects in an apparent three-dimensional space display, comprising:

a server providing object information, the server comprising an object data storage unit storing information corresponding to the object attributes and displaying data for each object, and a three-dimensional space data production unit searching the object data storage unit, positioning the object data in three-dimensional space by matching values for three types of object attributes selected from the object attributes stored in the object-data storage unit for each object to each of three coordinate axes in three-dimensional space, and displaying the object according to a predetermined vantage point; and a client terminal selecting an object from the object information provided, the client terminal comprising a notifying unit selecting the object attributes of a displayed object and notifying the server, a receiving unit receiving the three-dimensional space data produced by the server, and a vantage point changing unit changing the vantage point with respect to the displayed three-dimensional space, wherein the server and the client terminal are connected to the system via a network, and when the vantage point is changed, the three-dimensional space data production unit redraws the object according to the changed vantage point, and wherein each object positioned in the apparent three-dimensional space display is enclosed within a frame of uniform size, the uniform size based on a number of articles to be displayed, ease of viewing when displayed and overall balance.

5. A three-dimensional object display method displaying objects in an apparent three-dimensional space display according to object attributes used as criteria to select one or more objects, the method comprising:

searching an object data storage unit storing information corresponding to the object attributes and displaying data for each object; and producing three-dimensional space data to position each object by calculating coordinate values for the three-dimensional space in which to position each object based on the object attribute values selected from the object attributes for each object according to results of the search of the object data storage unit so as to display each object according to results of the calculation of the coordinate values for the three-dimensional space, wherein each of the objects positioned in the apparent three-dimensional space display is enclosed within a frame of a uniform size and the frame and the objects enclosed therein are reduced or enlarged depending on a distance of the three-dimensional space from a vantage point outside the three-dimensional space, and wherein the uniform size of the frame is determined based on a number of articles to be displayed, ease of viewing when displayed, and overall balance.

6. A computer-readable medium storing program code causing a computer to display objects in an apparent three-dimensional space display according to object attributes used as criteria to select one or more objects, the program comprising:

a first program code unit searching an object data storage unit that stores information corresponding to the object attributes and displaying data for each object; and a second program code unit producing three-dimensional space data to position each object by calculating coordinate values for the three-dimensional space based on the object attribute values selected from the object attributes for each object, according ot results of the search of the object data storage unit so as to display each object according to results of the calculation of the coordinate values for the three-dimensional space, wherein the second program code unit encloses each of the objects positioned in the apparent three-dimensional space display within a frame of a uniform size and reduces or enlarges the frame and the objects enclosed therein depending on a distance of the three-dimensional space from a vantage point outside the three-dimensional space, and wherein the uniform size of the frame is determined based on a number of articles to be displayed, ease of viewing when displayed, and overall balance.

7. A computer-implemented method causing objects to be displayed in an apparent three-dimensional space display according to object attributes used as criteria to select one or more objects, the method comprising:

searching an object data storage unit storing information corresponding to the object attributes and displaying data for each object; and producing three-dimensional space data to position each object by calculating coordinate values for the three-dimensional space in which to position each object based on the object attribute values selected from the object attributes of each object, according to results of the search of the object data storage unit so as to display each object according to results of the calculation of the coordinate values for the three-dimensional space, wherein each of the objects positioned in the apparent three-dimensional space display is enclosed within a frame of a uniform size and the frame and the objects enclosed therein are reduced or enlarged depending on a distance of the three-dimensional space from a vantage point outside the three-dimensional space, and wherein the uniform size of the frame is determined based on a number of articles to be displayed, ease of viewing when displayed, and overall balance.

8. A computer specially configured by executing program code stored on a computer-readable medium causing objects to be displayed in an apparent three-dimensional space display according to object attributes used as criteria to select one or more objects, the program comprising:

a first program code unit searching an object data storage unit storing information corresponding to the object attributes and to display data for each object; and a second program code unit for producing three-dimensional space data to position each object by calculating coordinate values for the three-dimensional space based on the object attribute values selected from the object attributes of each object, according to results of the search of the object data storage unit so as to display each object according to results of the calculation of the coordinate values for the three-dimensional space, wherein the second program code unit encloses each of the objects positioned in the apparent three-dimensional space display within a frame of a uniform size and reduces or enlarges the frame and the objects enclosed therein depending on a distance of the three-dimensional space from a vantage point outside the three-dimensional space, and wherein the uniform size of the frame is determined based on a number of articles to be displayed, ease of viewing when displayed, and overall balance.

9. A three-dimensional object display method to display objects in an apparent three-dimensional space display according to object attributes used as criteria to select at least one object, the method comprising:

searching an object data storage unit storing information corresponding to the object attributes and displaying data for each object;

producing three-dimensional space data to position each object by calculating coordinate values for a three-dimensional space in which each object is positioned based on object attribute values selected from the object attributes of each object, and based on results of the search of the object data storage unit to display each object according to results of the calculation of the coordinate values for the three-dimensional space; and dispersing positional coordinates of each object positioned within the apparent three-dimensional space display to reduce a display size of each object to prevent object data to be displayed in an overlapped state, wherein the objects have identical or contiguous coordinates so that a distance of the three-dimensional space from a vantage point is within a range, and wherein each object positioned in the apparent three-dimensional space display is enclosed within a frame of a uniform size, the uniform size based on a number of articles to be displayed, ease of viewing when displayed and overall balance.

10. A three-dimensional object display method to display objects in an apparent three-dimensional space display according to object attributes used as criteria to select at least one object, the method comprising:

searching an object data storage unit storing information corresponding to the object attributes and displaying data for each object; and producing three-dimensional space data to position each object by calculating coordinate values for a three-dimensional space in which each object is positioned based on object attribute values selected from the object attributes of each object, and based on results of the search of the object data storage unit to display each object according to results of the calculation of the coordinate values for the three-dimensional space, wherein the three-dimensional space is divided into movable planes or solid spaces to select and highlight object data positioned within the divided planes or solid spaces, and wherein each object positioned in the apparent three-dimensional space display is enclosed within a frame of a uniform size, the uniform size based on a number of articles to be displayed, ease of viewing when displayed and overall balance.

11. A computer-readable medium storing program code for causing a computer to display objects in an apparent three-dimensional space display according to object attributes used as criteria to select at least one object, the program comprising:

a first program code unit searching an object data storage unit storing information corresponding to the object attributes and displaying data for each object; and a second program code unit producing three-dimensional space data to position each object by calculating coordinate values for a three-dimensional space in which each object is positioned based on object attribute values selected from the object attributes of each object, and based on results of the search of the object data storage unit to display each object according to results of the calculation of the coordinate values for the three-dimensional space, wherein the second program code unit disperses positional coordinates of each object positioned within the apparent three-dimensional space display to reduce a display size of each object to prevent object data to be displayed in an overlapped state, and the objects have identical or contiguous coordinates so that a distance of the three-dimensional space from a vantage point is within a range, and wherein each object positioned in the apparent three-dimensional space display is enclosed within a frame of uniform size, the uniform size based on a number of articles to be displayed, ease of viewing when displayed and overall balance.

12. A computer-readable medium storing program code for causing a computer to display objects in an apparent three-dimensional space display according to object attributes used as criteria to select at least one object, the program comprising:

a first program code unit searching an object data storage unit storing information corresponding to the object attributes and displaying data for each object; and a second program code unit producing three-dimensional space data to position each object by calculating coordinate values for a three-dimensional space in which each object is positioned based on object attribute values selected from the object attributes of each object, and based on results of the search of the object data storage unit to display each object according to results of the calculation of the coordinate values for the three-dimensional space, wherein the second program code unit comprises:

program code unit dividing the three-dimensional space into movable planes or solid spaces, and program code unit selecting and highlighting object data positioned within the divided planes or solid spaces, and wherein each object positioned in the apparent three-dimensional space display is enclosed within a frame of uniform size, the uniform size based on a number of articles to be displayed, ease of viewing when displayed and overall balance.

13. A computer-implemented method causing objects to be displayed in an apparent three-dimensional space display according to object attributes used as criteria to select at least one object, the method comprising:

searching an object data storage unit storing information corresponding to the object attributes and displaying data for each object;

producing three-dimensional space data to position each object by calculating coordinate values for a three-dimensional space in which each object is positioned based on object attribute values selected from the object attributes of each object, and based on results of the search of the object data storage unit to display each object according to results of the calculation of the coordinate values for the three-dimensional space; and dispersing positional coordinates of each object positioned within the apparent three-dimensional space display to reduce a display size of each object to prevent object data to be displayed in an overlapped state, wherein the objects have identical or contiguous coordinates so that a distance of the three-dimensional space from a vantage point is within a range, and wherein each object positioned in the apparent three-dimensional space display is enclosed within a frame of uniform size, the uniform size based on a number of articles to be displayed, ease of viewing when displayed and overall balance.

14. A computer-implemented method causing objects to be displayed in an apparent three-dimensional space display according to object attributes used as criteria to select at least one object, the method comprising:

searching an object data storage unit storing information corresponding to the object attributes and displaying data for each object; and producing three-dimensional space data to position each object by calculating coordinate values for at three-dimensional space in which each object is positioned based on object attribute values selected from the object attributes of each object, and based on results of the search of the object data storage unit to display each object according to results of the calculation of the coordinate values for the three-dimensional space, wherein the three-dimensional space is divided into movable planes or solid spaces to select and highlight object data positioned within the divided planes or solid spaces, and wherein each object positioned in the apparent three-dimensional space display is enclosed within a frame of uniform size, the uniform size based on a number of articles to be displayed, ease of viewing when displayed and overall balance.

15. A computer configured by executing program code stored on a computer-readable medium causing objects to be displayed in an apparent three-dimensional space display according to object attributes used as criteria to select at least one object, the program comprising:

a first program code unit searching an object data storage unit storing information corresponding to the object attributes and displaying data for each object; and a second program code unit producing three-dimensional space data to position each object by calculating coordinate values for a three-dimensional space in which each object is positioned based on object attribute values selected from the object attributes of each object, and based on results of the search of the object data storage unit to display each object according to results of the calculation of the coordinate values for the three-dimensional space, wherein the second program code unit disperses positional coordinates of each object positioned within the apparent three-dimensional space display to reduce a display size of each object to prevent object data to be displayed in an overlapped state, and the objects have identical or contiguous coordinates so that a distance of the three-dimensional space from a vantage point is within a range, and wherein each object positioned in the apparent three-dimensional space display is enclosed within a frame of uniform size, the uniform size based on a number of articles to be displayed, ease of viewing when displayed and overall balance.

16. A computer specially configured by executing program code stored on a computer-readable medium causing objects to be displayed in an apparent three-dimensional space display according to object attributes used as criteria to select at least one object, the program comprising:

a first program code unit searching an object data storage unit storing information corresponding to the object attributes and displaying data for each object; and a second program code unit producing three-dimensional space data to position each object by calculating coordinate values for a three-dimensional space in which each object is positioned based on object attribute values selected from the object attributes of each object, and based on results of the search of the object data storage unit to display each object according to results of the calculation of the coordinate values for the three-dimensional space, wherein the second program code unit comprises:

program code unit dividing the three-dimensional space into movable planes or solid spaces, and program code unit selecting and highlighting object data positioned within the divided planes or solid spaces, and wherein each object positioned in the apparent three-dimensional space display is enclosed within a frame of uniform size, the uniform size based on a number of articles to be displayed, ease of viewing when displayed and overall balance.

* * * * *

UNITED STATES PATENT AND TRADEMARK OFFICE
CERTIFICATE OF CORRECTION

PATENT NO. : 6,879,322 B2
DATED : April 12, 2005
INVENTOR(S) : Kazue Iida et al.

It is certified that error appears in the above-identified patent and that said Letters Patent is hereby corrected as shown below:

Column 12,
Line 47, change "ot" to -- to --.

Signed and Sealed this

Third Day of January, 2006

JON W. DUDAS
*Director of the United States Patent and Trademark Office*